United States Patent [19]

Burke

[11] 3,930,036

[45] Dec. 30, 1975

[54] EDIBLE COLLAGEN SAUSAGE CASING AND METHOD OF PREPARING SAME

[75] Inventor: Noel I. Burke, Danville, Ill.

[73] Assignee: Tee-Pak, Inc., Chicago, Ill.

[22] Filed: July 12, 1974

[21] Appl. No.: 487,831

[52] U.S. Cl. .................. 426/140; 426/105; 426/277
[51] Int. Cl.² ............................................ A23L 1/31
[58] Field of Search ........... 426/105, 140, 277, 276, 426/278, 371, 282, 284, 657

[56] References Cited
UNITED STATES PATENTS

| | | | |
|---|---|---|---|
| 3,425,847 | 2/1969 | Talty | 426/277 |
| 3,533,809 | 10/1970 | Cohly et al. | 426/140 X |

Primary Examiner—Hyman Lord
Attorney, Agent, or Firm—Paul Shapiro; Joseph E. Kerwin; William A. Dittmann

[57] ABSTRACT

In the manufacture of an edible collagen casing, hide collagen is formed into a slurry, swollen with acid, and extruded as a thin-walled hollow tube into a coagulation bath. The extruded casing is subsequently tanned or hardened in an aluminum sulfate tanning bath followed by treatment with a dilute solution of glutaraldehyde. The casing is washed, plasticized and dried. A substantial improvement in the shirring of the casing is obtained when the gel casing is treated with an aqueous solution containing at least 0.002% (and preferably 0.05 – 0.15%) sodium dihydrogen phosphate, neutralized to pH 6.0 – 8.0, subsequent to the glutaraldehyde treatment and prior to drying of the casing.

9 Claims, No Drawings

EDIBLE COLLAGEN SAUSAGE CASING AND METHOD OF PREPARING SAME

BACKGROUND OF THE INVENTION

Natural casings are prepared from the intestines of various edible animals, primarily cattle, hogs and sheep. The intestines are removed from the slaughtered animal and are thoroughly cleaned by processes well-known in the art. Natural casings, which have been thoroughly cleaned, are stuffed with various sausage meat compositions and formed into sausage links in preparation for cooking. The sausages which are thus formed are cooked by the consumer and the sausage casings eaten with the cooked sausage. In the preparation of certain smoked or pre-cooked sausages, such as frankfurters and the like, the sausage is cooked or smoked or otherwise processed by the meat packer to render it edible without further treatment by the consumer.

Prior to about 1925, substantially all sausage casing were natural casings prepared from animal intestines. Since that time, there have been developed several types of synthetic sausage casings, primarily of a regenerated cellulose, which are used in the preparation of the major portion of sausages which are made and sold today. Cellulose casings are used in the preparation of large sausages, such as bolognas, salamis and the like, and are removed from the sausage by the consumer at the time of final preparation for eating. Regenerated cellulose casings are also used in the preparation frankfurter sausages wherein the casing is stuffed with sausage emulsion, linked, smoked, and cooked, and the casing removed from the finished sausage.

Regenerated cellulose casings have not proved satisfactory for the processing of pork sausages inasmuch as cellulose is not edible with the sausage and does not transmit the fat which is released from the sausage during cooking. As a result, there has been some demand for an artificial sausage casing which is edible and which has the properties desired in a casing to be used in the processing of pork sausages.

Over a period of many years, synthetic sausage casings have been prepared from animal collagen. Casings made of collagen have been prepared by processing animal hide to break the collagen into a fibrous structure and extrude the collagen fibers in the form of a doughy mass to produce tubular casings. The casings which have been prepared in this manner have been hardened with formaldehyde and have been used as a removable casing for processing various sausages. These casings have not been edible even though collagen itself is an edible material. More recently, edible sausage casings of collagen have been prepared and sold in commercial quantities. In the manufacture of edible collagen casings, considerable emphasis has been placed on the necessity for using collagen source materials which have not been subjected to a liming treatment. In fact, a number of recent patents describing the production of collagen have indicated that it is absolutely necessary to start with an unlimed collagen source material if an edible casing is to be obtained. While the use of unlimed collagen as a starting material has certain advantages, it has the substantial disadvantage of requiring a more severe mechanical treatment for removal of hair and the epidermal layer from the hides from which the collagen is obtained.

In the preparation of edible collagen casings, hide collagen is converted into a finely divided fibrillar form and extruded in the form of a dilute collagen slurry (e.g., 2–6% collagen content). The extruded collagen is passed into a sodium sulfate and/or ammonium sulfate coagulating bath which dehydrates the collagen slurry and forms a coherent collagen film. At this stage in the processing, however, the salt coagulated collagen film can be handled but will revert to a thin slurry upon further contact with water. It is therefore necessary to harden or tan the extruded collagen film to permit further processing of the film and to provide the film with sufficient strength for use as a sausage casing. A satisfactory tanning process must utilize a tanning agent which is very rapid in tanning action and completely non-toxic in the form in which it is present in the finished casing and must produce a casing of sufficient strength to be stuffed with sausage meat, linked, packaged, and finally cooked. In the preparation of edible collagen casings, one of the most successful methods of hardening or tanning the casing utilizes an alum tanning bath or a bath containing an aluminum salt complex, at a pH suitable for tanning. When casings are tanned or hardened using an aluminum tanning bath the tanned casing is generally quite strong and easy to handled during processing, reeling, shirring, packaging, etc., but often exhibits certain deficiencies in handling at the time of stuffing with sausage emulsion during cooking. Aluminum tanned casings generally are somewhat stiff and are difficult to link after stuffing. Also, it has been found that aluminum taned casings often tend to split during frying of sausages stuffed therein and thus are not entirely satisfactory for the preparation of pork sausages. Another problem that has arisen with aluminum tanned casings is that the casings are somewhat springy and difficult to shirr to short coherent strands. The casing does not crease adequately during the shirring process and the shirred strands are somewhat flexible. This does not prevent the casing from being used commercially but does make it more difficult to handle and requires longer boxes or cartons for packaging than is desirable. Some improvement in cooking properties of the casing has been obtained by adding a subsequent glutaraldehyde tanning step in the process following the aluminum tanning step. The product obtained from such a process, however, is still somewhat springy and does not shirr into a very tight compact strand.

DESCRIPTION OF THE PRIOR ART

In the past, edible sausage casings have been prepared from animal collagen usually obtained from animal hides. The animal hides were processed by removing the epidermal layer and the hair to obtain a suitable collagen source referred to as a corium split. One technique described in the art for preparing collagen casing from a corium split is to break the collagen into a fibrous structure and extrude the collagen fibers in the form of a doughy mass. Casings prepared in this manner typically have been hardened with formaldehyde and, therefore, have not been considered an edible casing even though the collagen itself is an edible material.

Another technique for the preparation of edible sausage casings from a corium split is to break the collagen fibers into a fibrous structure by acid swelling, then form an aqueous slurry containing the swollen fibers, and extrude the slurry through an annular die to form a casing. The casing then is coagulated, tanned, plasticized, and dried to form a translucent, non-fibrous, edible product.

A number of recent patents describing the production of collagen casing which involves the extruding of a slurry containing swollen collagen fibers have indicated that it is absolutely necessary to start with an unlimed collagen source if an edible casing is to be obtained. Representative of these patents are U.S. Pat. No. 3,123,653 and U.S. Pat. No. 3,194,865. Reports of work with collagen obtained from a hide which had been subjected to substantial liming indicated that it did not swell or the extruded casing coagulate properly. Apparently, the extruded tubular casing disintegrated in the coagulation bath or on subsequent processing.

Because substantial liming of hides was detrimental to casing, the basic process of the prior patents employed the use of fresh bovine hides and subjected them to mechanical treatment rather than liming. These hides were washed with cold water for the purpose of removing blood and dirt and then defleshed with a scraping machine. The hair and epidermal layer then were cut with a horizontal band knife to obtain a corium split.

While the early patents indicated that edible collagen casings could not be obtained from a hide source which had been subject to liming, there was a continuing desire to find a process whereby edible casings could be manufactured from such a hide source. One of the reasons for this desire is economic. Liming permits ready separation of hair from the skin without damage to the skin and prevents bacterial degredation of the hide during storage. Secondly, with liming the hide is much easier to handle in the splitting operation.

Recent patents have indicated that edible casings can be derived from limed animal hides provided that the liming period is relatively short, e.g., 3 - 12 hours. Representative of these patents include U.S. Pat. Nos. 3,413,130, 3,512,997, U.S. Pat. Nos. 3,627,542, and 3,533,809 and 3,535,125. In these patents where limed hides are used as a source of collagen, there is included a deliming step which involves the neutralization of the lime in the hide by treatment with a dilute aqueous non-toxic acid having a pH of from about 2.5 - 6.5. This treatment forms water soluble calcium salts. Exemplary of the acid solutions used for deliming are citric acid in combination with an alkali metal citrate, acetic acid, fumaric, glutaric, hydrochloric, and others.

U.S. Pat. No. 3,373,046 shows a process somewhat different from the above patents for making edible casings from limed hides. In this patent, limed hides are neutralized with dilute acid, treated with an aqueous solution of a proteolytic enzyme, then swollen with dilute acid and extruded to produce tubular casing. The casing then is coagulated, tanned, plasticied, and dried to a final product.

U.S. Pat. No. 3,408,917 dicloses the tanning of edible collagen casings with an iron complex solution. U.S. Pat. No. 3,408,916 discloses the treatment of such an iron-tanned casing with a phosphate bath prior to washing and plasticizing for the purpose of removing a brown color which develops from the iron treatment. This phosphate treatment tends to remove the iron from chemical combination with the casing and makes it much weaker and more difficult to handle during further processing prior to drying. U.S. Pat. No. 3,533,809 discloses the coagulation of gel collagen casing in a phosphate coagulation bath followed by washing and then tanning in a solution containing an acid phosphate and glutaraldehyde. U.S. Pat. No. 3,425,847 discloses the preparation of edible collagen casings in which the gel collagen casing which has been coagulated in a salt bath is tanned sequentially in an aluminum salt complex bath followed by washing followed by retanning with a glutaraldehyde solution and finally plasticizing prior to drying. This process produces a commercially useable casing, but one which is somewhat springy as described above and difficult to shirr into a tightly compact strand.

SUMMARY OF THE INVENTION

This invention is based upon the discovery that edible collagen casings having improved shirring properties can be prepared by treating gel casing which has been tanned sequentially with an aluminum salt complex and glutaraldehyde with a phosphate subsequent to the last tanning step and prior to drying. The gel casing is prepared from eigher limed or unlimed or limed and delimed hides. The hide is split and defleshed to recover a substantially pure corium split.

When the hide is ground and swollen a slurry is produced which is extruded an annular die into a coagulating bath of sodium sulfate or ammonium sulfate to perform a salt-coagulated tubular casing. The casing is then tanned in a multi-step process. The salt-coagulated casing is passed into an aluminum tanning solution, washed, and then passed through a glutaraldehyde tanning solution. The tanned casing is again washed and finally plasticized with a glycerin solution. The tanned, washed, and plasticized casing is then dried, reeled, and eventually shirred and packaged. In this improved process, the coagulated and tanned casing is subjected to treatment with an acid ortho-phosphate salt at a pH of about 6.0 – 8.0 at a point in the process subsequent to the last tanning step and prior to drying. The phosphate treatment is preferably carried out simultaneously with the plasticization of the casing in a glycerin or like plasticizer solution.

The casing which is produced by this process performs better in stuffing, linking and cooking and substantially better in shirring than casing prepared by the prior art techniques. The improvement in casing properties which is obtained by phosphate treatment is similar for casings made from collagen slurries prepared from unlimed hides or enzymatically dehaired hides or hides which have been limed for short or long times and subjected to a subsequent swelling and/or deliming process.

DESCRIPTION OF THE PREFERRED EMBODIMENTS

In a preferred form of the process, animal hides, preferably steer or cattle hides, are cut into suitable pieces (hide trimmings may also be used) and are treated with a suitable lime solution for removal of hair. The liming treatment may be carried out for a period of time ranging from a few hours, e.g. 3 - 12 hours or less, up to several weeks, depending upon the type of solution used. A conventional liming solution without accelerators ordinarily requires two to four weeks treatment. Shorter periods of time may be used where the lime solution contains accelerators such as sodium sulfhydrate and dimethylamine sulfate. After the liming is complete, the hides are washed and split or otherwise mechanically abraded to remove the epidermal layer and any remaining hair.

The hides which are thus prepared are washed in a solution containing a non-toxic acid, such as an edible grade lactic acid, to clean the hides further and neutralize excess lime in the hides. This cleaning and neutralization step is known in the prior art discussed above. When the hides have been limed for a short period of time, e.g. 3 – 12 hours, the neutralization with lactic acid or other non-toxic acid requires only a few hours. When the hides have been fully limed for a period of two to four weeks or more, they are delimed by treatment with acid either in an unswollen condition at about pH 4.5 or after thorough swelling by treatment with concentrated lactic acid. This latter treatment is described more fully in the copending application of Noel I. Burke, Ser. No. 347,293 filed Apr. 2, 1973.

The hides which have been cleaned and neutralized are then cut into small pieces and ground or otherwise comminuted into particles of very small size to produce an aqueous slurry having a collagen content in the range from about 2 – 8%, preferably about 4.0 – 6%. The collagen is maintained at a temperature less than about 20°C. (preferable less than 10°C.) during the grinding, by repeated addition of ice to the mixture. The collagen slurry which is thus prepared is treated with a dilute solution of weak acid, such as lactic acid, to swell and burst the collagen fibers as previously described.

The swollen collagen slurry is then extruded through an annular die to produce a thin-walled tubular product suitable for use as a sausage casing after tanning and further processing. In order to obtain maximum strength in the product casing, the collagen slurry is preferably extruded through a die having rotating inner and/or outer parts of the type well known in the art.

The collagen slurry is extruded through the die into a coagulating bath consisting of a concentrated solution of sodium sulfate and/or ammonium sulfate. The thin-walled collagen tube which is formed in the coagulating bath is a gel collagen casing which is then passed into a dilute salt solution as a wash bath and then through multi-tanning steps. The first tanning bath consists of a solution of aluminum salt, rendered partially basic or buffered to a pH in excess of 3.0. The casing is next passed through a wash bath and then through a second tanning bath consisting of a dilute solution of glutaraldehyde and then washed and plasticized. The casing which is thus prepared is inflated with air or other gas and passed through a dryer from which the casing is rolled up on reels and subsequently shirred. In this invention, the casing is treated with an aqueous solution containing at least 0.002% phosphate salt in the form of sodium dihydrogen phosphate neutralized with sodium hydroxide to pH 6.0 – 8.0, at a point subsequent to the last tanning step and prior to drying. A phosphate salt concentration of 0.05 – 0.15% is preferred and at pH 6.5 – 7.5 is approximately an equimolar mixture of sodium hydrogen phosphate and sodium dihydrogen phosphate. The amount of phosphate used and the residence time in the phosphate bath is preferably not appreciably in excess of the stoichiometric amount of phosphate required for reaction with all of the aluminum present in the casing. The amount of aluminum used in the tanning bath and the residence time of the casing in the time in the aluminum tanning bath are related to produce an aluminum content in the casing ranging from about 0.2 to 5%, preferably about 0.5 to 1.5%.

While the casing is preferably wound up on reels and subsequently shirred it is possible to shirr directly out of the dryer. This has the advantage that it is easier to maintain the casing in an inflated state but has the disadvantage that the shirring machine is capable of operation at a substantially higher rate of speed than the rate of extrusion of casing in the process. Shirring machines which may be used are typically those used in the shirring of regenerated cellulose casings, such as those shown in U.S. Pat. Nos. 2,722,714, 2,722,715 2,723,201 and 3,122,517.

In this process, the use of a glutaraldehyde retanning bath following the aluminum tanning bath, together with a final phosphate treatment, has been found to be necessary to produce a casing which links properly and cooks properly without excessive splitting and particularly a casing which shirrs compactly to a relatively short length. When the process described above was carried out with only the aluminum tanning bath, the casing which was produced was of adequate strength for processing, shirring, and packaging but was found to be extremely difficult to link after stuffing. When the process was carried out with an aluminum tanning bath followed by a glutaraldehyde tanning bath the casing which was produced linked and stuffed properly but tended to be somewhat springy and did not shirr to a sufficiently compact form. The inclusion of the phosphate treatment in the process resulted in a casing which would have a shirred length only about two-thirds that of the shirred length of casing which had not been given the phosphate treatment. The phosphate treatment is therefore useful in improving the shirring of the casing and produces a more compact shirred strand with less damage resulting from the shirring process.

The following non-limiting examples are illustrative of the application of this invention to the preparation of a satisfactory edible collagen casing having improved shirrability.

Example 1

In this example, the preparation of edible collagen casings from lightly limed animal hides with combined aluminumglutaraldehyde tanning and a phosphate after treatment is illustrated. Selected cattle hides from carcasses certified fit for human consumption, weighing about 65–75 lbs. each, are the starting material for this process.

As soon as possible after flaying and inspection, the hides are washed in a large volume of circulating cool (10°C) water to remove adhering blood. After washing, the hides are fleshed fresh, without curing, to remove adhering fatty and muscular debris from the flaying operation.

The washed and fleshed hides are then treated in a liming bath containing 6% wt. of fresh calcium hydroxide and 1.5% of sodium sulfhydrate (the liming bath may contain up to 3% dimethylamine sulfate), as solution and/or slurry contained in about 450% wt. of water at room temperature (15°–20°C), all percentages being calculated on the weight of the hide being treated. The treatment is carried out for a period less than about six hours, sufficient to remove most of the hair from the hide, and the hides are gently agitated from time to time to insure even penetration of the liming liquor.

After liming, the hides are removed from the liming bath and permitted to drain for a period of about one-half hour while suspended. The limed hides are then gently squeezed, as between rubber rollers, to remove excess liming liquor.

The hides which have been thus limed, drained, and squeezed, are then cut or split in the plane of the hide into two approximately equal portions by weight. The upper or outer hide surface contains all of the hair, hair follicles, sebaceous and sudorific glands. The inner or corium layer consists substantially of collagen. The outer or hair-containing layer or split is discarded as unsuitable for use in the preparation of casing but may be used for the formation of leather laminates or other products.

The corium layer or split is then placed in a tank or vat containing about 4.5 times the hide weight of water at a temperature less than about 15°C. Gentle agitation is used to insure even removal of debris and adhering lime solution and/or slurry. The hides are washed during a period of about 20 – 30 minutes. The washings are removed and the corium splits resuspended in 4.5 times their weight of cool (15°C) water. Edible grade lactic acid, suitably diluted at a concentration of 2 – 4 ounces of 44% lactic acid per quart of cool (15°C) water is added in small portions at 15 minute intervals, with gentle agitation for 5 minutes of each 15 minute period. The liquor is tested for pH before each addition, and the end point is regarded as the point when the pH is permanently depressed below 7.0. In general, this requires about 1.5% of 44% lactic acid, based on the weight of the corium splits. This treatment is effective to neutralize the excess lime in the corium layer and to remove it as a soluble salt. The rate of addition of the lactic acid solution is carefully regulated so that the temperature of the bath is never permitted to rise above about 32°C. While the process preferably uses lactic acid as the neutralization or deliming solution, other edible grade acids or acidic materials, e.g., hydrochloric acid or ammonium chloride, may be used for removal of lime. The rate of addition of the lactic acid solution is carefully regulated so that the temperature of the drums is never permitted to rise above about 32°C.

The neutralized and delimed corium splits are then removed from the neutralization bath, drained and rinsed in cool (15°C) water, packed into polyethylene bags which are in turn placed in 50-gallon fiber durms. Dry ice in sufficient quantity is placed above and below the polyethylene bags to chill the prepared collagen and maintain it below 5°C during storage and/or shipment prior to preparation of the collagen slurry for extrusion. It should be noted, however, that the hides may, if desired, be cut into small pieces or small pieces of scrap hide material may be used in the steps of liming, splitting, and neutralization and deliming.

The delimed and/or neutralized corium splits are cut into small square or rectangular section, e.g. one-fourth to four inches on a side, in preparation for grinding or comminution. The small pieces of treated hide are converted to a fine pulp by successive passes through a meat grinder. In this grinding operation, sufficient ice is mixed with the hides splits to maintain a temperature below about 20°C (and preferably below about 10°C). Successive passes through the meat grinder use successively smaller dies, the smallest being about 1/40th inch. At this point, sufficient water is added to the pulp to produce a mixture containing about 90% water and 10% collagen.

The collagen pulp is then treated with sufficient dilute lactic acid (other dilute or weak acids such as citric or acetic acid may be used) to produce a pH of about 2.5 – 3.7. The acid is usually added to make a dilute solution, e.g. about 0.8 – 2.0%. After thorough mixing, the pulp and acid are stored overnight at a temperature of about 3°C to swell. At the end of this time, the collagen is swollen and has taken up all of the water in the slurry. The swollen collagen is mixed with sufficient water and acid to maintain a pH of 2.5 – 3.7, thus producing a thin homogeneous paste consisting of about 4% collagen and 1.2% lactic acid. While a 2 – 6% collagen content in the slurry is preferred for most applications, slurries containing up to about 8% collagen are used in the extrusion of thicker-walled larger diameter casings.

The swollen collagen slurry is passed through a homogenizer to further disperse the fibers and then is filtered to remove any dispersed fiber slumps or other solid contaminants. The paste is generally deaerated by storage under vacuum prior to extrusion. The process, from the washing of the limed hide through the acid swelling of the comminuted collagen, is preferably carried out in a period of less than about forty-eight hours.

The homogenized and filtered collagen slurry is then pumped under pressure through the extrusion die as previously described, into a coagulating bath consisting of about 40% ammonium sulfate (sodium sulfate can also be used) in water. When the collagen is extruded as a thin-walled tube into this concentration of ammonium sulfate, the collagen fibrils are dehydrated and collapse to form a film which is sufficiently coherent for further processing. The coagulation bath is circulated both inside and outside the tube during extrusion to maintain the tube in an inflated condition and to insure proper coagulation of the casing both on the inside and outside.

After the film is coagulated in the ammonium sulfate solution, it is necessary to tan the film to give it sufficient strength for further processing and for stuffing with sausage meat. If the film were taken from the ammonium sulfate coagulating bath and were dried, it would be of sufficient strength in the dry state but would revert to a paste upon contact with water. It is therefore necessary for the casing to be tanned or hardened to provide the necessary strength for further processing and to provide the necessary wet and dry strength required in an edible casing.

From the coagulation bath, the casing next passes into a first tanning bath which comprises a solution containing 5 – 20% of aluminum sulfate, $al_2(SO_4)_3 \cdot 18-H_2O$, 3 – 7% sodium citrate (or an equivalent amount of citric acid) and 3 – 7% sodium carbonate (or an equivalent amount of sodium hydroxide). The tanning bath is formulated so that the sodium citrate or citric acid forms a complex with the aluminum sulfate, and the sodium carbonate or sodium hydroxide neutralizes a portion of the aluminum-citrate complex to render the same about one-third to two-thirds basic. This results in a tanning bath having a pH above 3.0 and permits the use of aluminum concentrations for tanning which are many times the concentrations available with other aluminum tanning baths such as alum tanning baths.

From the first hardening bath or tanning bath, the casing passes through a wash bath in which unreacted tanning or hardening reagent is washed out of the casing. The casing is then passed through a second hardening bath consisting of a solution of about 100 parts per million glutaraldehyde in water. Glutaraldehyde solutions ranging from about 0.001 to 5.0% concentration may be used, depending upon the residence time in the solution and the temperature of the treating solution, and the amount of washing to which the casing is subjected.

Following the treatment with the glutaraldehyde solution, the casing passes into an additional wash bath (or baths) to wash out unreacted tanning or hardening reagents. The casing is finally passed through a plasticizing bath consisting of an aqueous solution of glycerin (or equivalent plasticizer such as sorbitol, dipropylene glycol, triethylene glycol, etc.). The pasticizing bath introduces a substantial amount of the desired plasticizer into the casing, which prevents it from becoming hard and brittle upon drying. The plasticizing bath also contains at least 0.002% of phosphate salt in the form of sodium dihydrogen phosphate neutralized with sodium hydroxide or sodium carbonate to a pH of about 6 – 8, preferably about 6.5 – 7.5. This phosphate solution is approximately equivalent to an equimolar mixture of sodium dihydrogen phosphate and sodium monohydrogen phosphate. The amount of phosphate salt contained in the plasticizing bath is preferably in range from about 0.05 to 0.15% sodium dihydrogen phosphate neutralized to pH 6 – 8. The amount of phosphate used in the plasticizing bath is related to the residence time of the casing in the bath and the amount of aluminum in the casing and is present not appreciably in excess of the stoichoimetric amount required for reaction with all of the aluminum present in the casing. Under the conditions used in this process, the amount of aluminum introduced into the casing is in the range from about 0.2 to 5% based on the weight of the casing and preferably ranges from about 0.5 to 1.5%.

From the plasticizing bath, the casing passes through a dryer where it is inflated and dried with the aid of heated air circulated by a fan or blower. Upon leaving the dryer, the casing is partially rehumidified, rolled up on reels, and then shirred on a machine of the type used in the shirring of regenerated cellulose casings. Alternatively, as noted above, the casing may be shirred directly out of the dryer. After the casing is shirred into individual short strands, it is packed in suitable cartons. Optionally, the casing may be cured after packaging by heating at a temperature not in excess of about 80°C. in an atmosphere of 20 – 50% relative humidity for several hours prior to shipment.

The several washing steps in this process are effective to remove essentially all of the reagents used in liming the hides and hardening or tanning of the extruded casing, with the exception of a minor amount of calcium and aluminum which is chemically bound in the collagen. The phosphate treatment precipitates any free aluminum salt in the form of the very insoluble aluminum phosphate salt and may even remove some of the aluminum which cross-links the collagen thus leaving a product which is bond more by hydrogen bonds than by the aluminum cross-linking agent.

When this casing was shirred on a commercial shirring machine, 40 feet of casing was shirred into a strand which was 6 ½ inches in length. The shirred strand was tightly compacted and quite stiff and easy to handle with a single hand without breaking or bending. The shirred casing strand did not have any appreciable tendency to expand on storage. The casing has a strength several time the minimum amount required for processing. While my theory of operation should not be considered binding in any respect, it is my opinion that the improved shirrability of this casing results from at least a partial conversion of the aluminum salt to the highly insoluble aluminum phosphate salt. The casing is then stressed during the shirring operation beyond its elastic limit which results in the pleats that are formed being more tightly creased and the shirred strand having very little tendency to expand to a greater length than its shirred and compressed length.

The casing manufactured and shirred as described above has been found to link satisfactorily and when sausages were cooked in the casing it was found to shrink with the meat and to release fat with little tendency to split out during cooking.

EXAMPLE 2

In this example, frozen steer hides are substituted for fresh cattle hides in the process. The frozen steer hides are thawed and treated as in the previous example. All other processing steps are as described in Example 1. The casing which is produced is a commercially accepted casing which is easily handled during processing and shirring with the improvements noted in Example 1.

EXAMPLE 3

In this example, fresh cattle hides were used which were subjected to liming for a period of two to four weeks followed by a deliming with lactic acid solution at a pH of about 4.5. Under these conditions the hides are not appreciably swollen ut are thoroughly delimed. The processing of the fully limed and delimed hides is otherwise as in Example 1.

The casing which is produced from the thoroughly limed and delimed hides exhibits the improved shirrability in the casing produced in Example 1.

EXAMPLE 4

In this example, fresh cattle hides were subjected to liming for a period of two to four weeks and were delimed by treatment with lactic acid and pre-swollen by soaking concentrated lactic acid, or equivalent, as set forth in the copending application of Noel I. Burke, Ser. No. 347,293,filed Apr. 2, 1973. The processing of the casing is otherwise as described in Example 1 above, particularly with reference to the treatment with phosphate salt in the plasticizing bath. The casing which is produced in this procedure exhibits the same improved shirrability described for the casing produced in Example 1.

EXAMPLE 5

In this example, completely unlimed hides are used in the preparation of casing. Cattle hides are washed and fleshed and treated in dilute acetic acid to partially swell and loosen the hair. After the acid treatment, the hides are split or cut in the plane of the hide into two approximately equal portions by weight. The corium layer is neutralized in a dilute solution of sodium bicarbonate. The hides are then washed and cut into small pieces and formed into a fine pulp following the procedure described in Example 1. The pulp is converted into a slurry which is extruded, tanned, washed, and plasticized and treated with phosphate salt as described in Example 1. The casing which is obtained in this manner by the two-step, aluminum-glutaraldehyde tanning and phosphate after treatment has the improved shirring properties described for casing produced in accordance with Example 1.

EXAMPLE 6

A series of experiments were carried out in which the procedure of the foregoing examples was varied by omitting the phosphate salt in the plasticizing bath. In each case, the casing shirred well but was quite springy and extended slowly from a shirred and compressed state to a length about 50% greater than the shirred length of casing produced in Example 1. In other words, when this casing was shirred and compressed it gradually expanded to a point where 40 feet of casing had a shirred length of about 11 inches as compared with the 6½ inch shirred length of the casing produced in Example 1. This shirred casing, while commercially useable, must be handled with two hands and is quite flexible. The casing is otherwise satisfactory.

While the several examples given above illustrate the addition of the phosphate salt to the plasticizing bath, it should be understood that the phosphate salt may be added at any point after the final tanning treatment with glutaraldehyde and prior to the drying step. It is convenient to add the phosphate in the plasticizing bath. The phosphate salt which is used may be any water soluble non-toxic phosphate, preferably an alkali metal phosphate such as sodium dihydrogen phosphate neutralized to a pH of 6 – 8. Alternatively, a mixture of the sodium dihydrogen phosphate and sodium monohydrogen phosophate may be added which has the desired pH, thus eliminating the necessity for a separate neutralization step. The amount of phosphate salt which is added produces a beneficial effect at levels as low as 0.002% in the plasticizing bath and concentrations of sodium dihydrogen phosphate, neutralized to pH 6 – 8, of 0.05 – 0.15% are preferred. As noted above, the amount of phosphate used need not be appreciably in excess of the stoichiometric amount required for reaction with all of the aluminum in the casing.

I claim:

1. In a method of preparing edible tubular collagen sausage casings which comprises:
   a. grinding animal hide collagen to form an aqueous slurry,
   b. treating the slurry with acid at a pH of 2.5 – 3.7 to swell the collagen,
   c. extuding the slurry at a collagen content of 2 – 8% through an annular die into a coagulation bath to form a tubular gel collagen casing,
   d. tanning the gel casing in two steps first in a tanning bath of an aluminum salt solution and then in a dilute solution of glutaraldehyde, and
   e. washing, plasticizing, and drying the casing to produce a translucent non-fibrous edible product, the improvement which comprises:
      treating the gel collagen casing with a dilute solution of an acid orthophosphate salt at pH 6 – 8 after the final tanning step and prior to drying, whereby the free aluminum in the gel casing is converted to an insoluble aluminum phosphate.

2. A method in accordance with claim 1 in which the collagen is from unlimed animal hides.

3. A method in accordance with claim 1 in which the collagen is from limed and acid-delimed animal hides.

4. A method in accordance with claim 1 in which the first tanning bath comprises a solution of an aluminum salt complexed with an organic acid and rendered partially basic by treatment with alkaline material, said tanning bath having a pH in excess of 3.0 and said second named tanning bath comprises an aqueous solution containing 0.001 – 5.0% glutaraldehyde.

5. A method in accordance with claim 1 in which the first tanning bath comprises a solution of 5 – 20% aluminum sulfate, $Al_2(SO_4)_3 \cdot 18H_2O$, 3 – 7% sodium citrate, and 3 – 7% sodium carbonate, formulated to produce a one-third to two-thirds basic aluminum sulfate salt complexed with sodium citrate.

6. A method in accordance with claim 1 in which the phosphate salt is a mixture of alkali metal mono- and dihydrogen phosphates.

7. A method in accordance with claim 1 in which the gel casing contains about 0.2 – 5% aluminum and is treated with a solution containing at least 0.002% of said acid phosphate salt and not substantially in excess of the stoichoimetric amount required to react with all of the aluminum in said casing.

8. A method in accordance with claim 1 in which said phosphate salt is added in the plasticizing bath just prior to drying said casing.

9. An edible sausage casing of collagen produced in accordance with claim 1.

* * * * *